Patented Aug. 17, 1937

2,089,985

UNITED STATES PATENT OFFICE 2,089,985

ACID HALIDES OF CARBAZOLE-N-CARBOXYLIC ACIDS AND PROCESS FOR THEIR PRODUCTION

William L. Ruigh, Rahway, N. J.

No Drawing. Application November 11, 1931, Serial No. 574,357

2 Claims. (Cl. 260—46)

This invention relates to the production of certain acid halides of carbazole-N-carboxylic acids, adapted as intermediates for a series of new derivatives, useful especially as anesthetic compounds.

It is an object of the invention to produce acid halides of carbazole-N-carboxylic acid and such substituted carbazole-N-carboxylic acids in which the acid halide group is attached to the nitrogen of the carbazole nucleus possessing the general formula

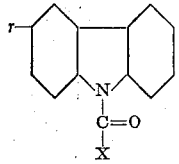

in which r represents one or more substituents in the carbazole nucleus in any of the eight available positions and X represents the halide element.

I have found that with such an acid halide I can produce an extensive series of dialkyl amino alcohol esters of carbazole-N-carboxylic acid or substituted carbazole - N - carboxylic acids and that certain salts of these esters with acids have more or less pronounced anesthetic action and appear to be especially useful as efficient local anesthetics. Such derivative compounds have the general formula

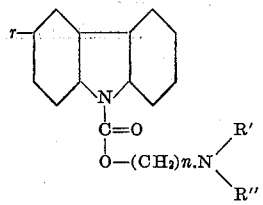

in which R' and R'' represent alkyl radicles or closed rings, such as the piperidine ring, $(CH_2)n$ represents a hydrocarbon chain, and any substituent or substituents in any one or more positions on the carbazole nucleus.

As a convenient and satisfactory general method of synthetizing compounds of such a series, I react upon carbazole-N-carboxylic acid chloride or such a substituted carbazole-N-carboxylic acid chloride with an appropriate quantity of a dialkyl-amino alcohol, for instance, in a solvent such as benzene. The mixture is heated for several hours to insure the completion of the reaction, after which the hydrochloride of the ester is filtered off and purified by crystallization from a suitable solvent such as alcohol.

In the production of such anesthetic compounds, I first synthetize an acid-halide of carbazole-N-carboxylic acid or suitably substituted carbazole-N-carboxylic acid, and this application concerns itself more especially with the production of such intermediate materials.

Hitherto the efforts to produce such acid halides as above described have not been successful. Paschkowetzky [Ber., 24, 2905, (1891)] sought to produce the acid chloride by the direct action of phosgene upon carbazole and upon potassium-carbazole, but the desired result was not attained. Copisarow [J. Trans. Chem. Soc. 113, 819, (1918)] prepared N-carbonyl carbazole by the action of phosgene on potassium-carbazole. The published literature does not reveal that any of the acid halides of carbazole-N-carboxylic acids have ever been produced.

I have now succeeded in forming such acid halides. This I accomplished for the production of the chloride, by heating carbazole or a suitably substituted carbazole suspended and/or dissolved in a suitable medium such as toluene or acetone with phosgene in the presence of an organic base, as, for example, pyridine, quinoline, dimethyl aniline, or other suitable tertiary amine. A preferred process for applying this means for producing the acid chloride of carbazole-N-carboxylic acid will be shown in the example to follow.

It has also been found possible to produce these acid halides by acting upon carbazole-N-carboxylic acid or suitably substituted carbazole-N-carboxylic acid, with phosphorus pentachloride or phosphorous pentabromide, as shown in Example II below.

By suitable substituents I wish to be understood to mean such substituents as will not give undesirable side reactions with the halogenating agents. Thus, for example, an amino substituent upon the carbazole nucleus will react in the presence of these halogenating agents to form a variety of undesirable products.

*Example I.*—Ninety grams of carbazole, 320 grams of a 25 per cent. solution of phosgene in toluene, and 500 grams of dry toluene are placed in a three-necked round-bottomed flask. The flask is equipped with a mercury-seal stirrer, a dropping funnel, and a reflux condenser. Sixty-four grams of dry pyridine, dissolved in 125 grams of toluene, are added in small portions while rapid stirring of the reaction mixture is maintained. The addition of the pyridine is regulated so that the mixture does not heat up too rapidly and release large amounts of gaseous phosgene from the solution. The reaction mixture is then heated for about an hour at 100° C. and is then allowed to cool to about 50° C. After cooling, 200 grams of a 12½ per cent. solution of phosgene in toluene and 20 grams of pyridine are added as before. The mixture is again heated as before and finally refluxed gently for half an hour. On cooling, the reaction mixture is filtered, the filtrate washed repeatedly with diluted hydrochloric acid, and then several times with water. The solution is then dried over calcium chloride, filtered, and the toluene distilled off. The residue distills in the neighborhood of 200° C. at 5 mm. and the distillate is obtained on cooling as a yellowish crystalline solid.

The crude product thus obtained melts at about 95° to 103° C. This is purified by recrystallizing from ligroin or other suitable medium. The resulting pure compound appears in the form of white needles, melting at 103.5° to 104.5° C., readily soluble in most organic solvents. It dissolves very easily in hot benzene, and is soluble in five parts of benzene at room temperature. It reacts readily with ammonia and amines. The amide forms white crystals melting at 246.5–247.5° C.; the anilide forms white needles, melting at 202° C.

With alcohols this acid chloride of carbazole-N-carboxylic acid reacts to form esters; the ethyl ester forms white needles melting at 72.9–74.4° C.

*Example II.*—Two grams of carbazole-N-carboxylic acid is dissolved in 50 grams of benzene; three grams of PCl₅ are then added in small portions. The resulting mixture is then warmed for about one half hour. The reaction mixture is filtered and the solvent evaporated off. The residue is taken up with ligroin and treated with decolorizing carbon. After filtering the ligroin solution it is washed with water and then dried over CaCl₂. By evaporation of the ligroin solution the crude product is obtained in the form of a white solid melting at 90 to 110° C. Further purification of the impure acid chloride is effected by repeated recrystallization from ligroin.

The yield of the acid chloride as obtained by this method of derivation from the carbazole-N-carboxylic acid with PCl₅, is relatively smaller than given by the treatment of carbazole as shown in Example I.

*Example III.*—Two grams of 3-methyl-carbazole is treated with a total of 30 grams of a 25 per cent. solution of phosgene in toluene and 4 grams of dry pyridine in the manner as described for the treatment of carbazole as shown in Example I. The same procedure as to stirring, heating, etc., are to be followed. Purification is effected by recrystallizing from ligroin, and the substituted acid chloride is obtained in the form of clumped crystalline white needles melting at 73.5–74.5° C. The anilide from the reaction of the product with aniline forms white crystals melting at 183–184° C.

*Example IV.*—Five grams of 3-nitro-carbazole are placed in a glass bomb tube and 50 cc. of dry toluene, 14.1 gallons of a 25 per cent solution of phosgene in toluene and 1.9 gallons of pyridine added in this order. The tube is sealed and then heated in a bomb furnace for six hours at 130° C. On cooling, the tube is opened and the solution poured into a flask. The excess of phosgene is then boiled off and the solution cooled. It is then washed with dilute hydrochloric acid and water and dried over calcium chloride. The crude 3-nitro-carbazole-N-carboxylic acid chloride is obtained by concentration of the toluene solution in the form of a yellow solid.

Recrystallized from a mixture of benzene and isopropyl ether, it is obtained in the form of yellow needles with a melting point of 153–4° C.

Having thus set forth preferred methods for the production of the compounds described, by way of illustration, as to the application of the spirit and scope of the invention, I claim as my invention:

1. As a new compound, the acid chloride of carbazole-N-carboxylic acid having the formula

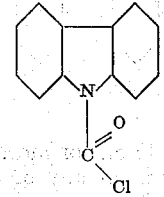

which, in pure condition, appears in the form of white needles melting at 103.5–104.5° C., very easily soluble in hot benzene, and readily soluble in most organic solvents, and whose amide forms white crystals melting at 246.5–247.5° C., and whose anilide forms white needles, melting at 202° C.

2. A process for the production of the acid chloride of carbazole-N-carboxylic acid which comprises reacting upon carbazole with phosgene in the presence of pyridine.

WILLIAM L. RUIGH.